(12) United States Patent
Baurmeister et al.

(10) Patent No.: US 6,270,674 B1
(45) Date of Patent: Aug. 7, 2001

(54) MEMBRANE MODULE WITH UNILATERALLY EMBEDDED HOLLOW FIBER MEMBRANES

(75) Inventors: Ulrich Baurmeister, Wuppertal; Rudolf Wollbeck, Erlenbach, both of (DE)

(73) Assignee: Akzo Nobel NV, Arnhem (NL)

(*) Notice: Subject to any disclaimer, the term of this patent is extended or adjusted under 35 U.S.C. 154(b) by 0 days.

(21) Appl. No.: 09/445,831

(22) PCT Filed: Jun. 2, 1998

(86) PCT No.: PCT/EP98/03262
§ 371 Date: Dec. 14, 1999
§ 102(e) Date: Dec. 14, 1999

(87) PCT Pub. No.: WO98/57733
PCT Pub. Date: Dec. 23, 1998

(30) Foreign Application Priority Data

Jun. 14, 1997 (DE) .............................................. 197 25 199

(51) Int. Cl.[7] .............................. B01D 61/00; B01D 63/02
(52) U.S. Cl. .................... 210/649; 210/638; 210/321.79; 210/321.8; 210/500.23; 210/502.1
(58) Field of Search .......................... 210/321.6, 321.72, 210/321.87, 321.81, 321.89, 321.78, 321.79, 321.8, 502.1, 638, 639, 651, 500.23, 649; 96/8

(56) References Cited

U.S. PATENT DOCUMENTS 3,923,664 * 12/1975 Grover et al. .
4,002,567   1/1977 Konno et al. .

(List continued on next page.)

FOREIGN PATENT DOCUMENTS 28 42 835   4/1980 (DE) .
30 22 313  12/1980 (DE) .

(List continued on next page.)

OTHER PUBLICATIONS

Membrane–Based Affinity Technology for Commercial Scale Purifications, Bio/Technology, vol. 6, (1988), pp. 779–782.

K. Sakai, "Determination of Pore Size and Pore Size Distribution/2. Dialysis Membranes", Journal of Membrane Science 96 (1994), pp. 91–130.

(List continued on next page.)

Primary Examiner—Ana Fortuna
(74) Attorney, Agent, or Firm—Oliff & Berridge, PLC

(57) ABSTRACT

A membrane module for substance-specific treatment of a fluid includes a housing with a bundle of hollow-fiber membranes with semipenneable, porous walls. The hollow-fiber membranes are embedded in a sealing compound only at one end, and flow around the second end is substantially unrestricted. The lumina of the hollow-fiber membranes are open at the unembedded end and lead into the external space surrounding the hollow-fiber membranes. The fluid to be treated is introduced via an inlet arrangement on only one of the two sides (inside or outside) of the hollow-fiber membranes and directed over this side as a primary stream such that a portion thereof flows as a permeate stream through the wall to the respective other side, the substance-specific treatment taking place on the permeate stream. After passing through the wall, the permeate stream is collected on the other side and reunited with the primary stream in the external space. Finally, the stream of the treated fluid, comprising the unified primary and permeate streams, is drained from the housing via an outlet arrangement.

26 Claims, 8 Drawing Sheets

U.S. PATENT DOCUMENTS

| | | | |
|---|---|---|---|
| 4,080,296 | * | 3/1978 | Clark . |
| 4,267,053 | * | 5/1981 | Hashino et al. . |
| 4,547,289 | | 10/1985 | Okano et al. . |
| 5,019,270 | | 5/1991 | Afeyan et al. . |
| 5,139,668 | * | 8/1992 | Pan et al. . |
| 5,160,627 | * | 11/1992 | Cussler et al. . |
| 5,332,498 | | 7/1994 | Rogut . |

FOREIGN PATENT DOCUMENTS

| | | |
|---|---|---|
| 39 23 128 A1 | 1/1991 | (DE) . |
| 0138060 | 4/1985 | (EP) . |
| 0 285 812 A1 | 12/1988 | (EP) . |
| 341 413 A2 | 11/1989 | (EP) . |
| 0 569 229 A1 | 11/1993 | (EP) . |
| 0 610 755 A1 | 8/1994 | (EP) . |
| 0659468 | 6/1995 | (EP) . |
| 0 732 141 A1 | 9/1996 | (EP) . |
| 0 732 142 A2 | 9/1996 | (EP) . |
| 0 787 523 A1 | 8/1997 | (EP) . |
| WO 90/05018 | 5/1990 | (WO) . |
| WO 93/02777 | 2/1993 | (WO) . |

OTHER PUBLICATIONS

Shin–ichi Nakao, "Determination of Pore Size and Pore Size Distribution/3. Filtration Membranes", Journal of Membrane Science 96 (1994), pp. 131–165.

L. Zeman et al., "Characterization of Microfiltration Membranes by Image Analysis of Electron Micrographs. Part I. Method Development", Journal of Membrane Science 71 (1992), pp. 221–231.

K. Kaneko, "Determination of Pore Size and Pore Size Distribution/1. Adsorbents and Catalysts", Journal of Membrane Science 96 (1994), pp. 59–89.

Elias Klein, "Affinity Membranes; Their Chemistry and Performance in Adsorptive Separation Processes", John Wiley & Sons, Inc., 1991. (Index).

* cited by examiner

MEMBRANE MODULE WITH UNILATERALLY EMBEDDED HOLLOW FIBER MEMBRANES

FIELD OF THE INVENTION

The invention relates to a membrane module for substance-specific treatment of a fluid, comprising a) a housing with a longitudinal extent, and b) therein, arranged substantially in the direction of the longitudinal extent of the housing, a bundle of hollow-fiber membranes with a semipermeable wall having a porous structure.

BACKGROUND

Substance-specific treatments of fluids are becoming increasingly significant for applications such as biotechnology, medicine, and chemical technology. Fluids include gases, gas mixtures, and liquids such as protein solutions, prefiltered suspensions, and clear solutions. An example of substance-specific treatment is the extraction of active agents from cell suspensions in which genetically modified cells have generated substances such as antibodies, hormones, growth factors, or enzymes, usually in small concentrations. Other important applications are the extracorporeal removal of undesired substances from human blood plasma and extraction of components such as immunoglobulins or clotting factors from the plasma of donated blood. Finally, another broad application area is the catalytic or biocatalytic—enzymatic—treatment of liquids, such as the hydrolysis of oils by lipases immobilized in a matrix.

The substance-specific treatment of fluids is frequently conducted such that the fluid to be treated is brought into contact with a carrier material, on and/or in which interacting groups or substances are immobilized that, in a specific, selective manner, interact with the target substance contained in the fluid, i.e., with the substance that is the object of the substance-specific treatment. Such interactions can be, for example, cationic or anionic exchange, hydrophilic/hydrophobic interaction, hydrogen bridge formation, affinity, or enzymatic or catalytic reactions, and the like. In affinity separation of substances, ligands are coupled to or immobilized in the carrier material and have the function of adsorptively binding a specific single target substance or an entire class of substances. This target substance is termed a ligate. One example of class-specific ligands are positively charged diethylaminoethyl (DEAE) groups or negatively charged sulfonic acid ($SO_3$) groups, which adsorb the class of positively charged or negatively charged molecules, respectively. Specific ligands are, for example, antibodies against a certain protein, which is bound as a ligate to the antibody.

The major criteria in the substance-specific treatment of fluids are productivity and selectivity. With a view toward productivity, it is important that, per unit of volume, as many groups as possible are available that act in a substance-specific manner and can interact with the target substance contained in the fluid to be treated. At the same time, it is desirable to maximize the transport of the target substance to the groups or substances acting in a substance-specific manner.

One carrier material for ligands that is frequently employed in affinity chromatography is sepharose particles, which are present in bulk form in a chromatographic column. Even if a high concentration of ligands, with high selectivity, can be realized in this case, the productivity is known to be low due to the compressibility of the sepharose particles. Furthermore, the access of the ligates to the ligands contained in the sepharose particles is diffusion controlled, which results in long residence times and thus low throughput and productivity, in particular when separating larger molecules such as proteins, due to their low diffusion rates.

Improved chromatographic column materials made from rigid, porous particles through which convective flow is possible are described in U.S. Pat. No. 5,019,270. Compared to the previously cited column material, these particles permit a reduction of residence time and increased productivity. However, even chromatographic columns filled with these particles exhibit with larger-diameter column diameters a non-uniform flow rate that has a negative effect with respect to the uniform utilization of all the ligands present in the chromatographic column. Furthermore, technical control of the pressure required becomes more complex as the diameters increase.

The cited disadvantages of particle-shaped carrier materials led to the development of a number of processes for substance-specific treatment of fluids using porous, semipermeable membranes. Due to their porous structure, membranes present a large inner surface area, so that a large number of functional groups can be coupled to the membrane, in high concentration per volume unit, which can interact with the fluids to be treated that flow through the membrane (see, for example, E. Klein, "Affinity Membranes", John Wiley & Sons, Inc., 1991; S. Brandt et al., "Membrane-Based Affinity Technology for Commercial Scale Purifications", Bio/Technology Vol. 6 (1988), pp. 779–782).

Membranes are available that are made from a wide variety of materials and with varying pore structures, so that adaptation to the physico-chemical properties of the fluids to be treated and convective transport through the membrane of the fluid to be treated, for example with a target substance contained therein, is possible. Moreover, due to the generally thin walls (<100 $\mu$m, for example), membranes are distinguished by short transport distances of the fluid to be treated to, for example, the interacting groups immobilized in the membranes, resulting in relatively short residence times, low pressure losses, high linear flow rates, and thus high binding rates.

A number of modules containing such membranes have been described that are used in processes for substance-specific treatment of fluids. In this case, a distinction must be drawn between so-called dead-end mode, or dead-end modules, and cross-flow mode, or cross-flow modules.

In the cross-flow mode, the fluid flows as a feed stream parallel to one side of the membrane. A portion of the feed stream thereby passes through the membrane. The partial stream after passing through the membrane is drained off as a permeate, and the portion remaining on the feed stream side as a retentate. On the permeate side of the membrane as well, an additional fluid stream can be introduced that then absorbs the partial stream after it passes through the membrane.

In dead-end mode, on the other hand, the entire fluid entering the membrane module as a feed stream is directed through the membrane and removed as a filtrate or permeate from the downstream side of the membrane opposite the upstream side.

Dead-end membrane modules on the basis of hollow-fiber membranes are used extensively for applications in the fields of ultra- or microfiltration and often for treatment of liquids with gases, for example. In one part of these membrane modules, as described in EP-A-0,138,060 or EP-A-0,659,468; for example, the hollow-fiber membranes have been folded in a U-shape and their ends embedded jointly in a sealing compound and open. The gas or liquid to be filtered flows, for example, via the open ends into the lumina of the hollow-fiber membranes and, due to the prevailing pressure differential, permeates into the external space surrounding the hollow-fiber membranes. In the case of filtration applications, the component that is filtered out remains in the membrane.

In another embodiment of dead-end membrane modules, the hollow-fiber membranes are arranged substantially linearly in the housing and their open ends are embedded jointly in a sealing compound, while their other ends are free, i.e., not embedded. The unembedded ends of the hollow-fiber membranes are closed in these modules. Such membrane modules are described in U.S. Pat. No. 4,002,567, U.S. Pat. No. 4,547,289, EP-A-0,138,060, or EP-A-0,732,142, for example.

All dead-end membrane modules have a disadvantage in that they are often not suited for the treatment of suspensions, for example, when the size of the particles contained in the suspension is on the order of magnitude of the pore diameter. The particles would lead to the formation of a coating on the membrane wall and block the membrane. For application in affinity separation processes for suspensions, for example, such dead-end modules can be driven only in combination with an upstream pre-cleaning stage. This causes a reduction of efficiency in such a process, in part also because in many cases a large portion of the target substance is lost by such pre-cleaning.

The cited disadvantages of modules operated in dead-end mode with respect to their usability with suspensions, for example, can in part at least be avoided by the use of cross-flow modules. With the latter, the accumulation of a layer of suspended particles can be reduced by the feed stream flowing parallel to the membrane surface if the shear stress is sufficiently high.

WO 90/05018 discloses a cross-flow module with hollow-fiber membranes for use with affinity separation processes. In this module, a ligate-containing liquid is introduced into the module housing via an inlet arrangement and flows tangentially over one side of the hollow-fiber membranes, in and on which the ligands have been coupled. A portion of the liquid permeates the membrane, whereby the ligates are attached to the ligands, and exits as a permeate stream on the side of the membrane opposite the inlet side. The retentate and permeate streams are removed via separate outlet arrangements.

A modified cross-flow process is described in WO 93/02777. For specific removal of components from blood, a plasma filter is used that is made from hollow-fiber membranes bended in a U-shape and embedded at their ends in a specially shaped housing. Blood flows through the lumina of the hollow-fiber membranes, and the substance-specific treatment is performed on the blood plasma, separated using the membrane, in the external space surrounding the hollow-fiber membranes in the housing, which contains a cleaning agent. The bundle can be divided into an inflow branch and an outflow branch. Due to the positive trans-membrane pressure developing in the inflow branch, convective transport of blood plasma takes place through the membrane into the external space. In the outflow branch, the treated plasma flows, due to the developing negative trans-membrane pressure, back into the lumina of the hollow-fiber membranes and is reunited with the blood.

In EP-A-0,341,413, an adsorber module for treating whole blood is described in which blood flows in cross-flow mode through the lumina of the hollow-fiber membranes contained in the module, embedded at both ends in sealing compound and provided with ligands. In this process, plasma passes through the hollow-fiber membrane wall as a permeate into the external space surrounding the hollow-fiber membranes, whereby the treatment of the plasma takes place in the membrane wall. In a special embodiment, this module has no outlet for the permeate; rather the plasma separated as a permeate collects in the external space surrounding the capillaries and, due to the developing pressure conditions, again passes through the hollow-fiber membrane wall into the lumen of the hollow-fiber membrane. Since the permeate stream must flow through the membrane wall twice in such a module design, this permeate stream and thus the portion of the plasma subjected to substance-specific treatment are relatively small. An additional result is that the required treatment times are relatively long.

The described modules operated in cross-flow mode exhibit various disadvantages. In the case of separate permeate and retentate streams, additional pumps and/or monitoring elements are required. Furthermore, production of the modules is complex as a result of embedding of the hollow-fiber membranes at both ends, and the portion of membranes that is without function with respect to the substance-specific treatment increases due to the embedding, more so as the module lengths decrease. Since in the case of cross-flow modules only a portion of the overall fluid to be treated is directed through the membrane, a series connection of multiple modules is often required. This, however, considerably increases the complexity of producing and operating the cross-flow modules in the prior art.

OBJECTS AND SUMMARY OF THE INVENTION

It is therefore an object of the invention to provide a membrane module for substance-specific treatment of fluids, in which the cited disadvantages of the prior art are at least reduced, which is easy to manufacture, flexibly adaptable to the respective fluid treatment, and in particular is also suitable for suspensions.

It is a further object of the invention to provide a process for efficient substance-specific treatment of fluids, using semipermeable membranes with a porous structure, in which the aforementioned disadvantages are at least reduced.

These and other objects achieved by a membrane module for substance-specific treatment of a fluid, comprising a) a housing extending in a longitudinal direction;

b) therein, arranged substantially in the longitudinal direction, at least one bundle of hollow-fiber membranes with semi-permeable walls having a porous stricture, wherein said hollow-fiber membranes each have first and second ends and at least one lumen extending along a longitudinal axis of the membrane, wherein each hollow-fiber membrane is embedded in the housing via a sealing compound only at the first end and flow around the second end is substantially unrestricted, and wherein the hollow-fiber membranes are surrounded by an external space delimited by the inner wall of the housing and by the sealing compound, each hollow-fiber membrane having an inside facing its at least one lumen and an outside facing the external space;

c) at least one first inlet arrangement for introducing fluid to be treated into the housing on only one of the two sides (inside or outside) of the hollow-fiber membranes at a time; and d) an outlet arrangement for draining the treated fluid from the housing, whereby the outlet arrangement is open toward the external space surrounding the hollow-fiber membranes;

the lumina of the hollow-fiber membranes being open at their second ends and leading into the external space.

These object are furthermore achieved by a process for substance-specific treatment of a fluid using this membrane module, wherein the hollow-fiber membranes have an inside facing their at least one lumen and an outside facing the external space, the process comprising at least the following steps:

a) Introducing the fluid to be treated into the housing, b) Passing the fluid to be treated as a primary stream over one of the sides of the hollow-fiber membranes such that a portion of this primary stream flows as a permeate stream into the wall of the hollow-fiber membranes via this one side, through the wall to the respective other side, whereby the substance-specific treatment of the fluid takes place on the portion of the fluid to be treated representing the permeate stream, and then out of the wall through the other side, c) Combining the permeate stream after it has passed through the wall of the hollow-fiber membranes and after substance-specific treatment, with the primary stream flowing on the one side of the hollow-fiber membranes.

d) Draining the combined stream of the treated fluid, consisting of the primary and permeate streams, from the housing.

Hollow-fiber membranes in the context of the present invention also include membrane types such as tubes or pipes.

Fluids to be treated are, generally speaking, those fluids that contain specific materials or substances that are the target of the substance-specific treatment.

BRIEF DESCRIPTION OF THE DRAWINGS

The invention will be described in more detail in the following with reference to the drawings, which are in simplified, schematic form.

DETAILED DESCRIPTION OF PREFERRED EMBODIMENTS

Figure 1:
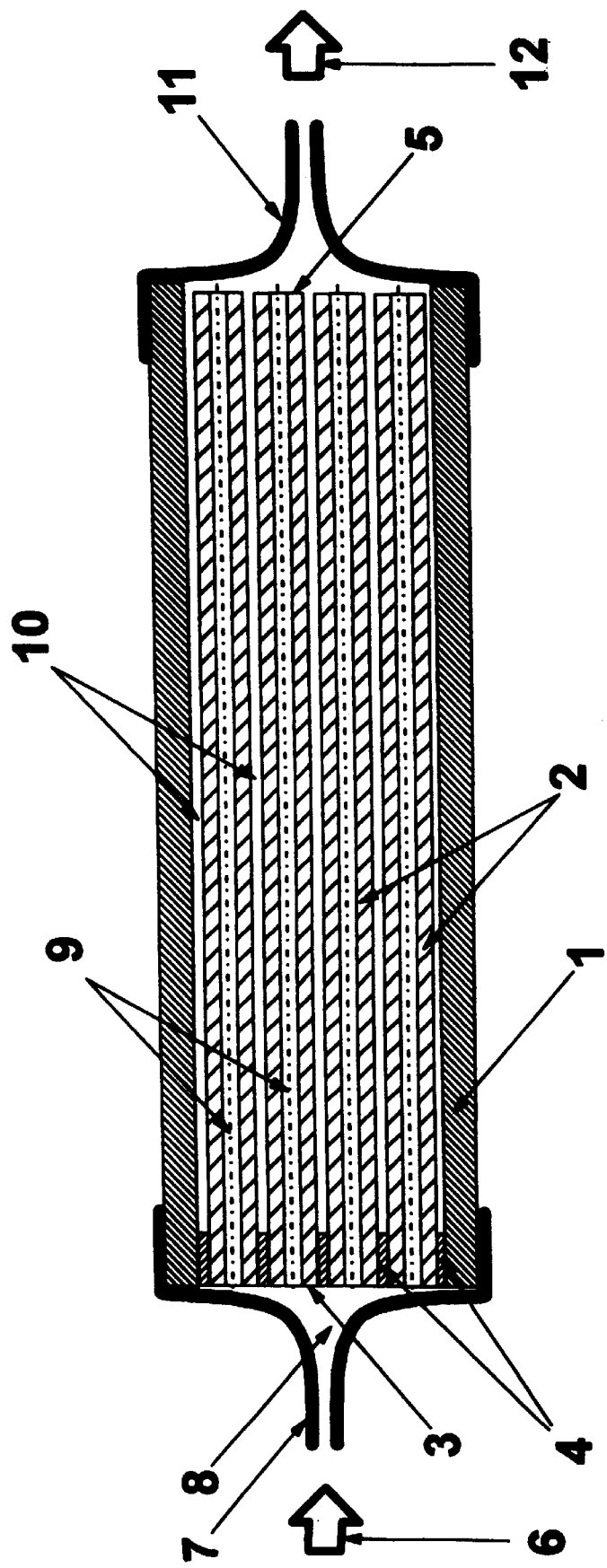
FIG. 1 shows a membrane module in which the primary stream flows through the lumina of the hollow-fiber membranes.

In membrane modules according to invention, or in conducting processes according to the invention for substance-specific fluid treatment, the hollow-fiber membranes are subjected to flow in cross-flow mode: the fluid to be treated flows as a primary stream over one of the two sides of the hollow-fiber membranes, i.e. the side facing their at least one lumen or the side facing the external space, substantially parallel to their longitudinal extent, and a part of the fluid to be treated flows as a permeate through the walls of the hollow-fiber membranes to the respective other side of the hollow-fiber membranes. Here, the lumen of the hollow-fiber membranes is understood to be the cavity in the interior of the hollow-fiber membrane that is enclosed by its wall and extends in the direction of the longitudinal axis. The side facing the at least one lumen of the hollow-fiber membranes is understood to be the inside and the side facing the external space the outside of the hollow-fiber membranes. The hollow-fiber membranes can also have more than one continuous cavity extending along the hollow-fiber axis, i.e., more than one lumen. Such hollow-fiber membranes are described in DE-OS 30 22 313 or DE-OS 28 42 835, for example.

To enable the substance-specific treatment of large amounts of fluid, the bundle contained in the housing comprises a plurality of adjacently arranged hollow-fiber membranes. In the extreme case, however, the bundle can also consist of a single hollow-fiber membrane. Of course, the bundle can also be comprised of a plurality of partial bundles.

In accordance with preferred embodiments of the membrane module according to the invention, the at least one inlet arrangement leads into the external space and is adjacent to the sealing compound. The lumina of the hollow-fiber membranes are advantageously closed at their embedded ends.

In other advantageous embodiments of the membrane module of the invention, the at least one inlet arrangement is in communication with a distribution space that is adjacent to the end face of the sealing compound and spatially separated from the external space by the sealing compound. In preferred embodiments, the distribution space is in communication with the external space via passages introduced into the sealing compound, and the lumina of the hollow-fiber membranes are closed at their embedded first ends. In the simplest case, these passages are holes passing through the sealing compound. Advantageously, however, the passages are implemented as fluid permeable elements that are embedded into the sealing compound along with the hollow-fiber membranes, whereby especially good results have been obtained when such elements are in the form of capillaries or tubes.

In the previously cited embodiments of membrane modules according to the invention, the fluid to be treated is introduced into the external space surrounding the hollow-fiber membranes. The outlet arrangement in this case is, practically speaking, in the vicinity of the second end of the hollow-fiber membranes, i.e., at the end of the housing opposite the sealing compound. This causes the fluid to be treated to flow as a primary stream through the external space surrounding the hollow-fiber membranes substantially along the longitudinal extent of the hollow-fiber membranes in the direction of the outlet arrangement. In these cases, a channel system for the primary stream is formed by the external space surrounding the hollow-fiber membranes.

Due to the pressure gradient resulting from the flow through this channel system, a portion of the primary stream flows as a permeate substantially along the entire extent of the hollow-fiber membranes through their semipermeable, porous walls. The substance-specific treatment is performed on this partial stream. Subsequently, the partial stream, having undergone substance-specific treatment, enters the lumina of the hollow-fiber membranes, which in this case serve as a collection space for the permeate. The permeate stream leaves the lumina, or collection space, via the openings at the second end of the hollow-fiber membranes and unites with the primary stream flowing through the channel system, before the unified stream comprising the primary stream and permeate is drained as treated fluid out of the housing via the outlet arrangement.

In likewise preferred embodiments of the membrane modules according to the invention, the at least one inlet arrangement is likewise in communication with a distribution space that is adjacent to the end face of the sealing compound and spatially separated from the external space by the sealing compound. The first, embedded ends of the hollow-fiber membranes in this embodiment, however, pass through the sealing compound and are open at this end. In this case, the fluid to be treated flows as a primary stream via the inlet arrangement of the housing into the distribution space and from the latter into the lumina of the hollow-fiber membranes, flows through the latter over their longitudinal extent, and leaves them via their openings at the second, unembedded ends of the hollow-fiber membranes. The primary stream thus passes through the hollow-fiber membranes on the lumen side, and in this case the totality of the lumina of the hollow-fiber membranes forms the channel system for the primary stream.

Due to the pressure gradient resulting from the flow through the lumina, substantially along the entire extent of the hollow-fiber membranes, a portion of the primary stream flows as a permeate through their semipermeable, porous walls. The substance-specific treatment is performed on this partial stream. Subsequently, the partial stream, having undergone substance-specific treatment, exits into the external space surrounding the hollow-fiber membranes, which in this embodiment serves as the collection space for the permeate. The permeate stream flows through this external space in the direction of the outlet arrangement of the housing and unites in the external space within the housing with the primary stream flowing out of the channel system, i.e., the lumina. The treated fluid, i.e., the fluid stream comprising the primary stream and permeate, is directed out of the housing via the outlet arrangement. In the cited embodiment, the outlet arrangement can be located at various positions along the housing. Preferably, however, it is located in the vicinity of the sealing compound.

In further preferred embodiments, a membrane module according to the invention has at least one inlet arrangement that leads into the external space and is adjacent to the sealing compound, and at least one inlet arrangement that is in communication with a distribution space adjacent to the end face of the sealing compound and spatially separated from the external space by the sealing compound, whereby this distribution space is in communication with the lumina of the hollow-fiber membranes, the first ends of which pass through the sealing compound and are open at this end. In particular, this enables an alternating flow of a fluid as a primary stream through the lumina of the hollow-fiber membranes and a fluid as a primary stream outside through the external space.

For example, in the substance-specific treatment of a fluid to remove certain target substances contained in the fluid, such as via adsorption to suitable groups in the membrane, initially the fluid to be treated can flow as a primary stream through the lumina of the hollow-fiber membranes, whereby, as previously described, a partial stream flows as a permeate through the walls of the hollow-fiber membranes from the inside to the outside. After completion of the substance-specific treatment, an eluent can flow on the outside of the hollow-fiber membranes as a primary stream for elution of the target substances adsorbed on the membranes, whereby a partial stream flows through the walls of the hollow-fiber membranes as a permeate from the outside to the inside, thereby absorbing the target substances. Of course, the opposite procedure is possible, i.e., introducing the fluid to be treated into the external space and then introducing the elution fluid into the lumina of the hollow-fiber membranes.

Such an embodiment, in which, alternately, a fluid can flow first as a primary stream on one side of the hollow-fiber membranes and then a second fluid as a primary stream on the other side of the hollow-fiber membranes, can also advantageously be used in the substance-specific treatment of suspensions, if particles contained in the suspension can settle in or on the pore structure of the hollow-fiber membranes. In a first process step, the primary stream is introduced into the membrane module according to the invention on one side of the hollow-fiber membranes, whereby, with the permeate stream, particles of corresponding size can be flooded into the pore structure or flooded onto the pore structure of the membrane. In a subsequent step, the primary stream or a second fluid is introduced as a primary stream on the other side of the hollow-fiber membranes and, as a result of the prevailing pressure conditions, a permeate stream is formed that, compared to the permeate stream in the first process step, penetrates the walls of the hollow-fiber membranes in the reverse direction and thereby flushes the membrane structure of the particles previously applied by flooding. The second fluid can at the same time also be an eluent for further target substances also retained in the membrane structure in the first process step.

In dimensioning the collection space for the permeate, it is desirable that the flow resistance occurring when the permeate flows through the collection space is low compared to the flow resistance occurring in penetrating the semipermeable wall. At the same time, it is desirable that, per hollow-fiber membrane, a maximum portion of its overall volume defined by its outer contour consists of semipermeable porous membrane wall, in which the substance-specific treatment can take place.

In addition to influencing factors such as the hydraulic permeability of the membrane or the flow resistance in the collection space, the permeate stream flowing through the semipermeable walls of the hollow-fiber membranes is determined by the pressure gradient $dp/dx$ formed by the primary stream longitudinally to the hollow-fiber membranes. In this case, dp is the differential change in pressure over a differential increment dx in the direction of the primary stream. The greater the magnitude of this pressure gradient, the larger the primary stream through the membrane wall and consequently the larger the portion of the primary stream subjected to the substance-specific treatment. The pressure gradient in the direction of the longitudinal extent of a hollow-fiber membrane, i.e., along the channel system through which the primary stream flows, increases with the flow volume through the channel system, i.e., as the primary stream increases.

The magnitude of the pressure gradient dp/dx also increases with decreasing flow cross-section of the channels comprising the channel system through which the primary stream flows, i.e., with decreasing—depending on the embodiment—cross-sectional area of the lumina or the interstices between the hollow-fiber membranes and between the hollow-fiber membranes and housing inner wall. If the dimension of the flow cross-section of the channels of the channel system is small enough, sufficiently high pressure gradients occur in conjunction with appropriate throughput through or flow rates in the channel system to overlay the diffusive transport through the porous membrane structure with a considerably greater convective transport as a result of the permeate stream. On the other hand, the cross-sections of the channel must not be too small, so that—as in the case of the substance-specific treatment of suspensions, for example—the fluid to be treated can still flow through the channels unobstructed.

In membrane modules according to the invention, hollow-fiber membranes are preferably used with walls having a substantially uniform thickness. This also has the result that the permeate stream in flowing through the membrane covers substantially the same distances at each point of the hollow-fiber membrane, which is especially advantageous in attaining maximum uniformity of the residence time of the fluid to be treated.

When using a plurality of hollow-fiber membranes as a bundle, it is advantageous for the hollow-fiber membranes constituting the bundle to be separated from one another by spacers so that a space surrounding the hollow-fiber membranes is formed with defined interstices between the hollow-fiber membranes. This enables a uniform flow around the individual hollow-fiber membranes of the bundle. Furthermore, in the case in which the primary stream flows on the outside of the hollow-fiber membranes, the spacers permit the size of the flow cross-sections of the channels of the channel system surrounding the hollow-fiber membranes to be adjusted, allowing an influence to be exerted on the pressure gradient produced in the channels. In the case of substance-specific treatment of suspensions and introduction of the primary stream in the external space, the spacers also permit adaptation to the size of the particles contained in the suspension.

It is practical for the spacers to be designed such that they have an elastic component. In this way, such a bundle of hollow-fiber membranes can be easily inserted into the housing of the membrane module by first slightly pressing the bundle together, thus somewhat reducing the space between the hollow-fiber membranes, inserting it into the housing, and then releasing it, resulting in again increased spacing between the hollow-fiber membranes. As a result, the periphery of the bundle of hollow-fiber membranes contacts the housing inner wall and thus prevents undesired peripheral flow along the housing inner wall.

The hollow-fiber membranes within a bundle are preferably spaced from one another by textile threads. In principle, it is sufficient to lay the textile threads between the hollow-fiber membranes. Preferably, however, the hollow-fiber membranes are bound via the spacers into at least one hollow-fiber mat, whereby these spacers are especially preferably textile threads. Using known methods, such mats can be advantageously produced as knitted mats, woven mats, or small woven ribbons, or also as crocheted mats. In the case of weaving or knitting, the textile threads are the woven or warp threads running transversely to the hollow-fiber membranes. These transverse threads advantageously maintain the hollow-fiber membranes at a uniform distance from each other such that they are arranged substantially parallel to one another within the mats. Using such mats, bundles of hollow-fiber membranes can be produced that have a high order and in which a uniform channel system can be formed between the hollow-fiber membranes.

In further embodiments of the membrane module according to the invention, the hollow-fiber membranes are incorporated into the respective hollow-fiber mat using flat, preferably strip-shaped connecting elements, whereby these strip-shaped connecting elements at the same time function as spacers. Such strip-shaped connecting elements can run perpendicularly, but also at other angles, to the hollow-fiber membranes, which are advantageously arranged substantially parallel to one another, and laminated to them using, for example, a polyurethane-based adhesive applied pointwise.

Such mats of hollow-fiber membranes are preferably superimposed to form a stack or a bundle of individual mat layers of appropriate width. The hollow-fiber membranes can, however, as single or superimposed multiple layers, also advantageously be folded in a zigzag pattern to form a stack or bundle. In further embodiments of the invention, the described hollow-fiber membrane mats are superimposed, as single or superimposed layers, such that the hollow-fiber membranes of the individual layers are substantially parallel to each other and, using known processes, wound spirally around an axis or core, substantially parallel to the longitudinal extent of the hollow-fiber membranes, to form bundles.

In the bundles or stacks so formed, the individual windings or the individual layers are, for practical reasons, spaced from one another, for example using the woven or knitted threads or inserted connecting elements and, if necessary, additional spacers inserted between the individual winding layers, such as in the form of fluid-permeable nonwoven or woven fabrics.

A further advantageous embodiment comprises bundles produced from at least two superimposed hollow-fiber mats wound spirally around an axis or core, wherein the hollow-fiber bundle in each mat are mutually spaced from each other, wherein the hollow-fiber mats are superimposed such that the hollow threads of the superimposed hollow-fiber mats are arranged in a criss-cross manner. The production of such bundles is described in detail in EP-A-0,285,812. For such bundles, the angles formed between the hollow-fiber membranes arranged in a criss-cross manner can be between 0° and 120°. Angles between 30° and 90° have proven advantageous.

In a further advantageous embodiment, the hollow-fiber membrane bundles in the membrane modules according to the invention consist of core bundles containing hollow-fiber membranes arranged around a support thread, whereby the hollow-fiber membranes arranged around the support thread are wrapped by at least one winding thread. The support threads maintain mutual spacing between the hollow-fiber membranes contained in the core bundle. At the same time, the winding threads ensure a mutual spacing of the core bundles constituting the hollow-fiber membrane bundle, overall guaranteeing good flow around the hollow-fiber membranes contained in the hollow-fiber membrane bundle. Such hollow-fiber membrane bundles comprising core bundles are described in EP-A-0,732,141.

To increase the efficiency of the substance-specific treatment, it is advantageous if steps b) and c) of the process according to the invention are performed multiple times. This can be achieved by arranging multiple hollow-fiber membrane bundles as stages in series in the housing in the direction of the longitudinal extent of the hollow-fiber membranes. Given an appropriate design of the housing and the transitions between the individual stages, such a series arrangement of multiple stages is possible not only for embodiments of the membrane module in which the primary stream flows through the lumina of the hollow-fiber membranes but also for embodiments in which the primary stream flows through the external space surrounding the hollow-fiber membranes.

By virtue of the serial arrangement of a plurality of stages, the longitudinal dimension of the individual stage, i.e., the dimension in the direction of the longitudinal extent of the hollow-fiber membranes contained therein, can at the same time be kept short, thus avoiding a concentration change with respect to potential critical components in the fluid to be treated. This is particularly significant in processes for substance-specific treatment of suspensions wherein at least part of the suspended particles are to be retained by the semipermeable membrane wall of the hollow-fiber membranes and at the same time excessive concentration increases of suspended particles is to be avoided, such as in the substance-specific treatment of blood. By using comparatively short hollow-fiber membranes, only a small partial stream is diverted from the primary stream along the hollow-fiber membranes, so that the concentration changes remain low until the primary and permeate streams are subsequently reunited.

In membrane modules of the invention, the number of stages in the housing is preferably between 1 and 100. A number of stages between 1 and 10 has proven entirely satisfactory. It is advantageous if the individual stages are spaced from each other in order not to impede either the primary stream or the permeate stream locally by the next stage in the direction of the flow through the housing and to enable good intermixture of the primary and permeate streams. A uniform intermixture is advantageous to avoid adverse concentration fluctuations, for example.

In adapting to the requirements of the treatment process, it is of course also possible to serially arrange a plurality of membrane modules according to the invention, which preferably have a plurality of hollow-fiber membrane stages. In a further preferred embodiment of the process according to the invention, the fluid to be treated is recirculated and undergoes the treatment process multiple times until a desired treatment level has been attained.

Hollow-fiber membranes with differing outer contours, i.e., differing outlines when viewed in cross-section, can be used. The hollow-fiber membranes can, for example, have a contour that is substantially round or circular, triangular, rectangular, hexagonal, or octagonal. They can also be oval, elliptical, or with three or four lobes, etc. For use in membrane modules according to the invention or in conducting processes according to the invention, hollow-fiber membranes have proven satisfactory that have a wall thickness between 15 $\mu$m and 1500 $\mu$m, and hollow-fiber membranes with a wall thickness between 100 $\mu$m and 300 $\mu$m have proven especially satisfactory. Preferably, the hydraulic diameter of the hollow-fiber membranes employed is 50 $\mu$m to 900 $\mu$m. The hydraulic diameter $d_h$ is defined as $d_h=4*A/C$, where A is the area of the flow cross-section of the at least one lumen of the hollow-fiber membrane and C is the circumference of the flow cross-section of the respective hollow-fiber lumen. If the hollow-fiber membranes each have multiple lumina, A and C designate the sum of the areas or circumferences, respectively, of the individual lumina of the respective hollow-fiber membrane. Hollow-fiber membranes with a hydraulic diameter between 200 $\mu$m and 400 $\mu$m are especially preferred.

In embodiments of the membrane module according to the. invention in which the primary stream flows along the outside of the hollow-fiber membranes, the aforementioned ranges with respect to hydraulic diameter apply analogously for the cross-sections of the channels of the channel system formed by the external space surrounding the hollow-fiber membranes. In this case, the hydraulic diameter $d_{h1}$ of the channels is defined as $d_{h1}=4*A_1/C_1$, where $A_1$ is the area of the flow cross-section between the hollow-fiber membranes perpendicular to the hollow-fiber membranes and $C_1$ is the sum of the outer circumferences of all hollow-fiber membranes and the inner circumference of the housing. In these cases, the hydraulic diameter $d_h$ of the hollow-fiber membranes is preferably 1.2 to 12 times less than the hydraulic diameter $d_{h1}$ of the channels.

In preferred embodiments of the invention, the permeate stream flows through the semipermeable wall of the hollow-fiber membranes and transports the target substance convectively through the membrane. This requires that the semipermeable, porous wall of the hollow-fiber membranes have a pore size that permits a convective transport of the target substance through the membrane wall. For a given pressure gradient in the channel system through which the primary stream flows and for given geometric dimensions of the hollow-fiber membranes, the permeate stream is of course maximized when the mean pore size of the membrane is maximized. During use, the pore size must also be adjusted to the size of the target substance, which can be in the form of dissolved macromolecules or also small particles with a size in the submicron range. At the same time, it can be required in many cases, such as the substance-specific treatment of suspensions, that the membrane exercise a separation function and retain components contained in the suspension that are not target substances. This means that the pore size must not exceed a certain maximum value. This can prevent a blockade of the pore system or, for example, adverse interactions between such components to be retained and substance-specific groups provided in the membrane for interacting with the target substances.

On the other hand, with consideration for the applications as described later of membrane according to the invention or embodiments of the processes according to the invention, it can be more important to use membranes with minimum pore sizes and maximum pore volume or porosity, in order to provide maximum inner surface area, i.e., the area formed by the pores, of the membranes for the substancespecific treatment. Preferably, membranes used in accordance with the invention have a mean porosity between 50% and 90% by volume. The mean porosity is understood to be the ratio of the pore volume of the membrane to the membrane wall volume, where the membrane wall volume is the sum of the pore volume and the volume of the material constituting the membrane structure.

The requirements placed on the construction of the membrane, i.e., on its structure and pore size distribution across the wall thickness, are given by the respective application for substance-specific treatment. The membrane structure can be isotropic across the thickness, i.e., the pore diameters are substantially constant within the membrane structure. It can be anisotropic, symmetrical, or asymmetrical, and the membrane can have a layer of considerably denser pore structure, i.e., a skin, on one side. In the case of an asymmetrical membrane, the denser structure can face either the primary stream or the collection space for the permeate. For example, in the substance-specific treatment of suspensions, it can be necessary for the membrane to have a small pore diameter on the side facing the primary stream in order to achieve a specific separation effect. To at the same time obtain as large a permeate stream as possible through the membrane wall, however, it is practical for the remaining membrane structure to have coarser pores, but not too coarse, depending on the application, in order to obtain maximum inner surface area.

Hollow-fiber membranes are preferred with a mean pore diameter between 0.005 and 5 µm, is the use of hollow-fiber membranes with a mean pore diameter between 0.1 and 3 µm is especially preferred.

To determine the mean pore diameter, different methods are used depending on the pore diameter and membrane structure. For pore structures that are substantially isotropic, pore diameters are determined indirectly by a filtration experiment in which an aqueous dextran solution with a prescribed size distribution of dextran molecules is filtered through the membrane. From the measured relative retention as a function of the nominal molecule diameter, the pore diameter distribution is calculated and from it the mean pore diameter. This method is described, for example, by K. Sakai, J. Membrane Science 96 (1994), pp. 91–130, and by Shin-ichi Nakao, J. Membrane Science 96 (1994), pp. 131–165, for dialysis and filtration membranes, respectively.

For anisotropic membranes, which have a layer with denser pore structure, for example, the cited determination methods based on filtration experiments are also used to determine the mean pore diameter within the denser layer. To determine the mean pore diameters of the coarser pore areas of the anisotropic membranes, an image-analysis method according to L. Zeman et al., J. Membrane Science 71 (1992), pp. 221–231, is employed. This method is suitable for pore sizes between 0.1 µm and 5 µm, by its nature for both isotropic and anisotropic pore structures.

For applications of membrane modules or processes according to the invention for liquids such as clear solutions or suspensions in particular, it is advantageous for the membranes to have a substantially constant mean pore diameter over at least 80% of the wall thickness. This permits a large inner surface area coupled with a large number of immobilized, substance-specific groups in the membranes and at the same time a low pressure loss in the flow through the membrane wall and thus a greater permeate stream. A substantially constant mean pore diameter is understood to be one that changes over the wall thickness of the membrane by not more than +/–50%.

For the substance-specific treatment of suspensions, it is advantageous to use membranes having a layer on the side facing the primary stream that has a smaller mean pore diameter than the adjacent region of the membranes in the direction of the lumen with a substantially constant mean pore diameter. This layer is advantageously between 1 µm and 5 µm thick and has a mean pore diameter that is 5 to 50 times smaller than the mean pore diameter in the adjacent area.

In membrane modules according to the invention, or to conduct processes according to the invention, preferably porous membranes with a large inner surface area are used. Porous membranes have proven satisfactory that have a BET surface area between 2 and 300 $m^2$ per $cm^3$ of wall volume, and those hollow-fiber membranes with a BET surface area between 8 and 30 $m^2$ per $cm^3$ of wall volume have proven especially satisfactory. The BET method for determining the surface area of porous membrane structures, which is based on the measurement of nitrogen adsorption, is described by K. Kaneko, J. Membrane Science 96 (1994), pp. 59–89.

There are no restrictions whatsoever with respect to the material from which the hollow-fiber membranes according to the invention are made. Membranes can be used that are made from inorganic materials such as glass, ceramics, $SiO_2$, carbon, or metal, or from organic polymers or blends thereof. The polymers can be hydrophilic and/or hydrophobic in nature. They can be selected from the group of cellulosic polymers such as cellulose or regenerated cellulose, modified cellulose such as cellulose esters, cellulose ethers, amine-modified celluloses, or blends of cellulosic polymers, from the group of synthetic polymers such as polyacrylonitrile and corresponding copolymers, polymers containing polyurethane, polyarylsulfones and polyarylethersulfones such as polysulfone or polyethersulfone, polyvinylidene fluoride, polytetrafluoroethy-Lene, water-insoluble polyvinyl alcohols, aliphatic and aromatic polyamides, polyimides, polyetherimides, polyesters, polycarbonates, polyolefins such as polyethylene, polypropylene, polyvinyl chloride, polyphenylene oxide, polybenzimidazoles and polybenzimidazolones, as well as from modifications, blends, mixtures, or copolymers derived from these polymers. Other polymers can be mixed as additives with these polymers or polymer blends, for example polyethylene oxide, polyhydroxyether, polyethylene glycol, polyvinylpyrrolidone, polyvinyl alcohol, or polycaprolactone, or inorganic materials such as $SiO_2$. In individual cases, the membrane can also have been subjected to a surface modification, for example, in order to establish certain properties of the membrane surface, such as in the form of certain functional groups. When using polyolefin polymers, it can be necessary to coat at least the inner surface of the membrane with a polymer permitting functionalization.

Particularly good results have been obtained with membranes made from cellulosic polymers, polyamides, polypropylene, polyethersulfones, or from solvent-stable and pH-stable polymers, in particular with membranes made from polytetrafluoroethylene or polyvinylidene fluoride, and from modifications, blends, mixtures, or copolymers derived therefrom. Such membranes are described in DE-A-39 23 128, for example.

There are no special requirements for the shape of the inner cross-section of the housing in which the hollow-fiber membranes constituting a bundle or the stages of hollow-fiber membranes are arranged. For practical reasons, the inner cross-section is adapted to the respective application of the membrane module according to the invention or to the contour of the bundles contained in the housing. Preferably, however, housings with square, rectangular, hexagonal, octagonal, or round inner cross-section are used.

The bundles of hollow-fiber membranes, preferably having spacers with an elastic component, are inserted into the housing under slight compression and then released for positioning in the housing. Subsequently, the first ends of the hollow-fiber membranes are embedded in a fluid-tight manner in a sealing compound using methods known per se.

In embodiments in which the primary stream flows on the outside of the hollow-fiber membranes, the housings in a preferred embodiment have an inner cross-section that narrows along the hollow-fiber membranes in the direction of their second ends, i.e., the cross-sectional area of the housing decreases in this direction. This reduces the spacing between the hollow-fiber membranes in the direction of their second, unembedded ends, and the pressure gradient and thus the permeate stream are increased. At the same time, this promotes uniformity of the permeate stream over the longitudinal extent of the hollow-fiber membranes.

Membrane modules or processes according to the invention can be used for a wide variety of substance-specific fluid treatments. Fluids to be treated are preferably suspensions.

Especially good results during treatment are obtained if membrane modules according to the invention are used with processes according to the invention, whereby substance-specific groups are preferably immobilized on and/or in the hollow-fiber membranes. With consideration for the respective treatment process, different substance-specific groups can be immobilized on and/or in the hollow-fiber membranes, and interact specifically with different target substances contained in the fluid to be treated. In the same manner, different hollow-fiber membranes, with different substance-specific groups, can be used together. When using membrane modules with multiple stages, the hollow-fiber membranes of the individual stages can have the same, or different, substance-specific groups immobilized thereon.

For immobilization of substance-specific groups on and/or in the hollow-fiber membranes, processes described in the literature can be employed. The literature can also be consulted with respect to the substance-specific groups applying to the respective substance-specific fluid treatment. Various possibilities for immobilization of substance-specific groups can be considered, with respect to both the location and manner in which they are immobilized.

These substance-specific groups can be coupled to the membrane by adsorption or via covalent bonds. This coupling to the membrane can take place prior to insertion into the housing or after inserting the membrane into the housing of the membrane module according to the invention. Depending on the individual application, the substance-specific groups can, for example, be coupled substantially homogeneously to the entire surface of the porous membrane, i.e., to the outer surface facing the lumina or the external space as well as the inner surface formed by the pores, i.e. immobilized on and in the membrane. It can be necessary, however, for the substance-specific groups to be immobilized on only a portion of these surfaces, such as when individual components of the fluid to be treated are not to come into contact with the substance-specific groups.

There can also be a direct inclusion of substance-specific groups in the membrane matrix, in the case of membranes made from polymeric materials, by modification of the polymeric material with ionic, hydrophilic, or hydrophobic groups, for example, or by using polymer blends in which at least one polymer component has substance-specific groups. Another possibility is to incorporate such substance-specific groups or carrier substances or particles having such groups into the pore system of a membrane during its manufacture, or subsequently in the finished membrane, such as by flooding-in. In the latter case, it is practical for the membrane to have an asymmetrical structure and possibly a skin, whereby the openings of the skin or the pores of the fine-pored side of the membrane are dimensioned such that the substance-specific groups or the cited carrier substances or particles cannot penetrate.

In all cases, the pore size of the membrane used must be selected such that, despite the substance-specific groups immobilized in the pores, the target substances can be transported convectively through the membrane wall by at least a portion of the fluid to be treated.

In accordance with an especially preferred embodiment of the invention, the substance-specific groups are ligands for affinity separation of ligates from liquids to be treated, or catalysts, where catalysts are understood to also include biocatalysts such as enzymes. Preferred processes according to the invention are those for cleaning/separating ligates from a ligate-containing liquid, wherein hollow-fiber membranes are selected on and/or in which ligands for these ligates are immobilized, or membrane modules according to the invention are used that contain such hollow-fiber membranes. Furthermore, preferred processes are those for catalytic treatment of liquids, whereby hollow-fiber membranes are selected on and/or in which catalysts are immobilized or membrane modules according to the invention are used that contain such hollow-fiber membranes. The catalytic processes also include biocatalytic processes such as enzymatic processes.

As used herein, ligands can act non-specifically, group-specifically, or specifically, depending on the application. With respect to usable ligands and the possibilities of immobilizing them, reference is made to the discussions in European patent application EP 787 523, explicit reference to the disclosure of which is hereby made.

Membrane modules or processes or process according to the invention can be used for numerous applications for cleaning/separation of ligates from a ligate-containing liquid, as are generally known from the field of affinity chromatography, for example. Affinity chromatography in this case is understood to be biospecific adsorptions or ion-exchanger chromatography or metal chelate chromatography.

Applications of interest relate to cleaning of monoclonal liquids, removal of proteases for stabilizing biological liquids, recovering or therapeutically removing components from blood plasma or whole blood, removing pyrogens from biological or pharmaceutical liquids, separating enantiomers, isolating enzymes, or also to cell selection using specific ligands reacting to a specific surface protein of the cells, to name just a few examples. Membrane modules according to the invention are also excellently suited for applications in the field of genetic engineering, if, for example, convective transport of genes to viruses or cells immobilized on and/or in the membrane is to be achieved in such applications.

For applications in the field of enzymatic or general catalytic treatment of liquids, hollow-fiber membranes can be selected on and/or in which enzymes or catalysts have been immobilized using methods known per se. Concerning the catalytic treatments that can be conducted using membrane modules or processes according to the invention, reference is made to the discussions in European patent application EP 787 523, explicit reference to the disclosure of which is hereby made.

Spacers located between the hollow-fiber membranes can fulfill additional functions in addition to the spacer function. Aside from on and/or in the porous membrane wall, substance-specific groups can also be immobilized on the spacers. For this purpose, the spacers are advantageously made from the same polymer or polymer family as the membrane material. In particular for the spacers inserted between the mats of hollow-fiber membranes, textile fabrics have proven satisfactory such as are described by Y. Yang et al., J. Chromatographie 598 (1992), pp. 169–180. Woven fabrics with multifilament threads and an individual filament diameter between 1 μm and 30 μm have produced especially good results. Woven fabrics have also proven satisfactory in which both the warp and weft threads are at an angle between 30° and 60° to the direction of the primary stream.

FIG. 1 shows a membrane module according to the invention with a housing 1 containing hollow-fiber membranes 2 arranged as a bundle. At one end 3, the hollow-fiber membranes 2 are embedded in a sealing compound 4, and fluid can flow substantially unrestricted around the second end 5.

The fluid to be treated, represented by arrow 6, is fed via the inlet arrangement 7 into the distribution space 8, towards which the embedded ends 3 of the hollow-fiber membranes 2 are open. From the distribution space 8, the fluid to be treated is directed as a primary stream into the lumina 9 of the hollow-fiber membranes 2 and flows through the hollow-fiber membranes in the direction of the unembedded end 5. Due to the pressure gradient resulting from the flow through the lumina, a portion of the primary stream flows over the longitudinal extent of the hollow-fiber membranes 2 as a permeate stream through the porous, semipermeable walls of the hollow-fiber membranes 2 into the external space 10 surrounding the hollow-fiber membranes, whereby the partial stream flowing through the wall is subjected to a substance-specific treatment. The substance-specifically treated permeate is collected in the external space 10 and flows through the latter toward the outlet arrangement 11, uniting in the vicinity of the unembedded ends 5 of the hollow-fiber membranes 2 with the primary stream flowing out of the lumina 9. The unified fluid stream comprising the primary and permeate streams leaves the membrane module as treated fluid 12 via the outlet arrangement 11, which in the membrane module illustrated in FIG. 1 is arranged at the end of housing 1 facing the unembedded ends 5 of the hollow-fiber membranes 2.

Figure 2:
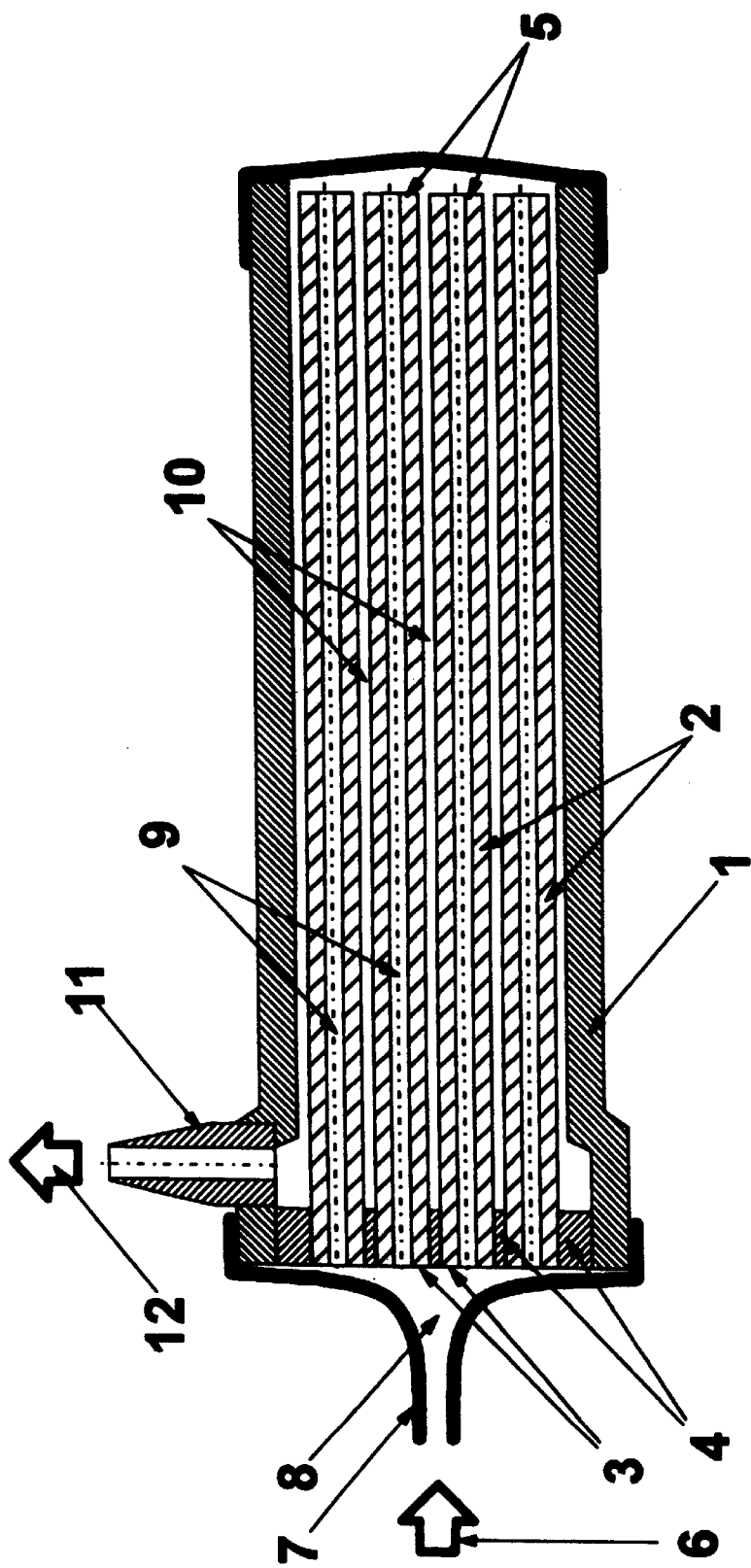
FIG. 2 shows a membrane module in which the primary stream flows through the lumina of the hollow-fiber membranes and the outlet arrangement is adjacent to the sealing compound.

The location of the outlet arrangement at the end of housing 1 facing the unembedded ends 5 of the hollow-fiber membranes 2 represents only one of several possibilities. As illustrated in FIG. 2, it is preferred, in the case in which the primary stream is fed through the lumina according to FIG. 1, for the outlet arrangement 11 to be located adjacent to the sealing compound 4 and thereby toward the first, embedded ends 3 of the hollow-fiber membranes 2. In this case, the primary stream, after leaving the lumina 9 of the hollow-fiber membranes 2 at their unembedded ends 5, flows through the external space 10 directly surrounding the hollow-fiber membranes 2, and leaves housing 1 as a treated fluid 12, mixed with the permeate stream also flowing through the external space 10, via outlet arrangement 11.

Figure 3:
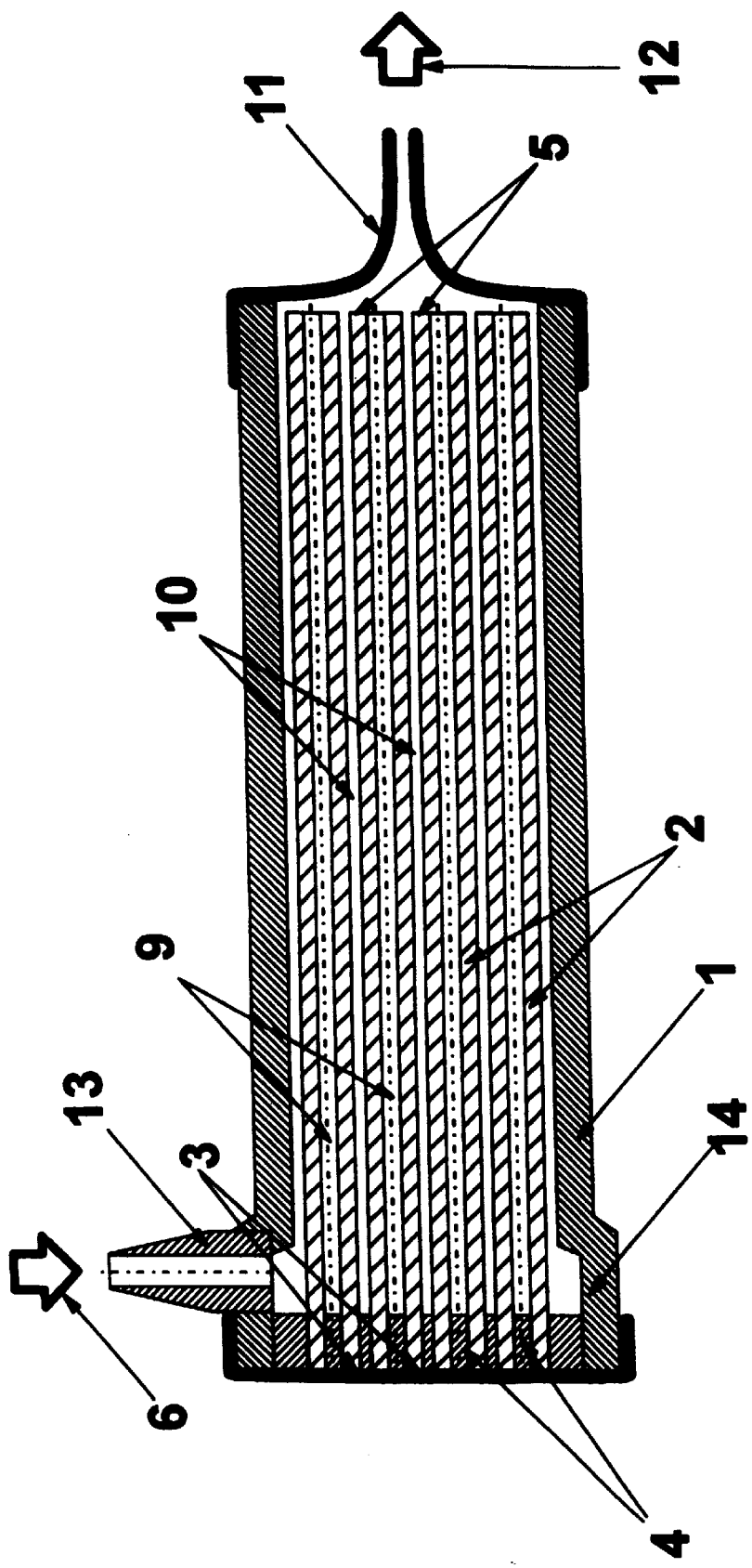
FIG. 3 shows a membrane module in which the primary stream flows on the outside of the hollow-fiber membranes.

In FIG. 3, a membrane module is illustrated in which the primary stream flows on the outside of the hollow-fiber membranes 2 arranged in a bundle. In this membrane module, the inlet arrangement 13 for the fluid 6 to be treated leads into the external space 10 and is adjacent the sealing compound 4. In the example illustrated, the housing 1 in the vicinity of the inlet arrangement 13 has an expansion 14 of the diameter to achieve a uniform distribution of the fluid to be treated as a primary stream over the entire bundle cross-section. In this embodiment, the first ends 3 of hollow-fiber membranes 2 are embedded in the sealing compound 4 such that the lumina 9 are closed at this end by the sealing compound 4.

The fluid 6 to be treated flows via the inlet arrangement 13 into the external space 10 surrounding the hollow-fiber membranes 2 and as a primary stream through this external space 10 substantially along the hollow-fiber membranes 2 in the direction of the outlet arrangement 11. Due to the developing pressure gradient, a permeate stream penetrates the semipermeable, porous walls of the hollow-fiber membranes 2 into their lumina 9, over substantially the entire extent of the hollow-fiber membrane bundle. The substance-specific treatment takes place on the permeate stream flowing through the walls of the hollow-fiber membranes 2. The treated permeate stream leaves the lumina 9 via the openings at the second ends of the hollow-fiber membranes 2 and unites at that point in the external space 10 with the primary stream, before the unified stream comprising primary stream and permeate is drained from housing 1 as a treated fluid 12 via the outlet arrangement 11.

Figure 4:
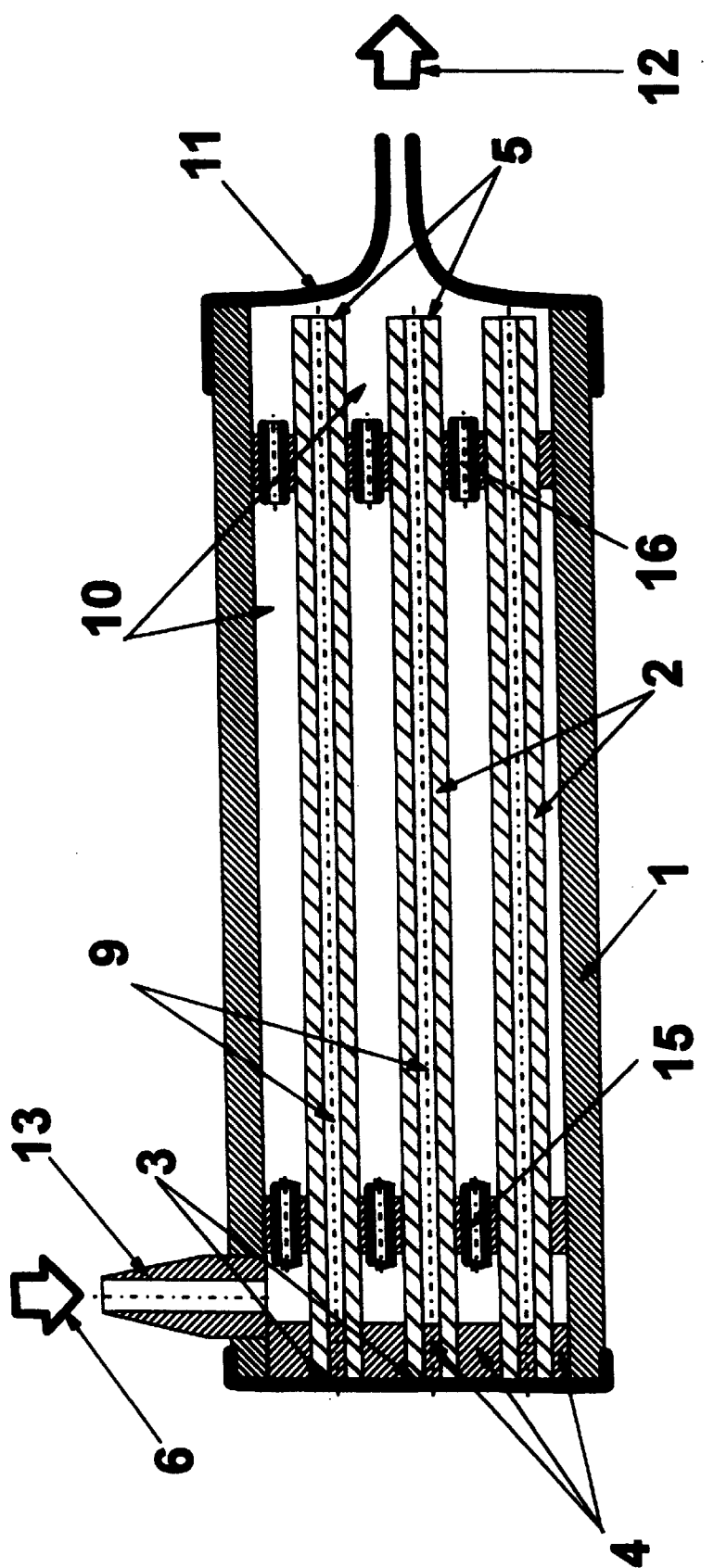
FIG. 4 shows a membrane module in which the primary stream flows on the outside of the hollow-fiber membranes and in which elements have been inserted between the hollow-fiber membranes to improve the flow uniformity and increase the pressure.

In a membrane module of the type illustrated in FIG. 3, in which the flow is around the outside of the hollow-fiber membranes arranged in a bundle, it is important to ensure a uniform distribution of the fluid to be treated over the bundle cross-section. This can be achieved in principle by making the flow resistance resulting from flow through the external space or the channel system formed by the external space sufficiently high, for example also by inserting elements into this external space that ensure increased flow resistance. In FIG. 4, as seen in the direction of the flow between the inlet arrangement 13 and outlet arrangement 11, elements 15 in the form of tubes or capillaries have been introduced in the external space 10 surrounding the hollow-fiber membranes 2, which ensure an increase in the flow resistance in the vicinity of the external space 10 adjacent to the inlet arrangement 13 and thus effect uniformity of the distribution of the primary stream.

In the membrane module illustrated in FIG. 4, moreover, additional elements 16 have been introduced into the external space 10 in the vicinity of the unembedded ends 5 of the hollow-fiber membranes 2 to increase the flow resistance. Using these elements 16, which are likewise implemented as tubes or capillaries, the flow resistance resulting for the primary stream when flowing through the external space can be increased and in this way the permeate stream through the hollow-fiber membranes increased.

Instead of tubular or capillary elements, other elements can be used to attain similar effects, for example in the areas shown in FIG. 4, along the hollow-fiber membranes to increase the flow resistance, such as in the form of appropriately designed fluid-permeable spacers or fluid-permeable nonwovens, which for example in the case of hollow-fiber bundles produced from hollow-fiber mats wound spirally around a core, are laid in the form of strips between the layers produced during winding.

Effects similar to those attainable through the use of the elements 16 to increase flow resistance can also be attained in membrane modules in which the primary stream flows around the hollow-fiber membranes 2, by appropriate design of the inner cross-section of housing 1. By reducing the housing cross-section in the vicinity of the hollow-fiber membranes in the direction of the unembedded ends 5 of the hollow-fiber membranes 2, the spacing between the hollow-fiber membranes comprising a bundle at the unembedded ends 5 is reduced compared to the spacing in the vicinity of the sealing compound. This increases the flow resistance in the direction of the ends 5, resulting in a greater permeate stream.

Figure 5:
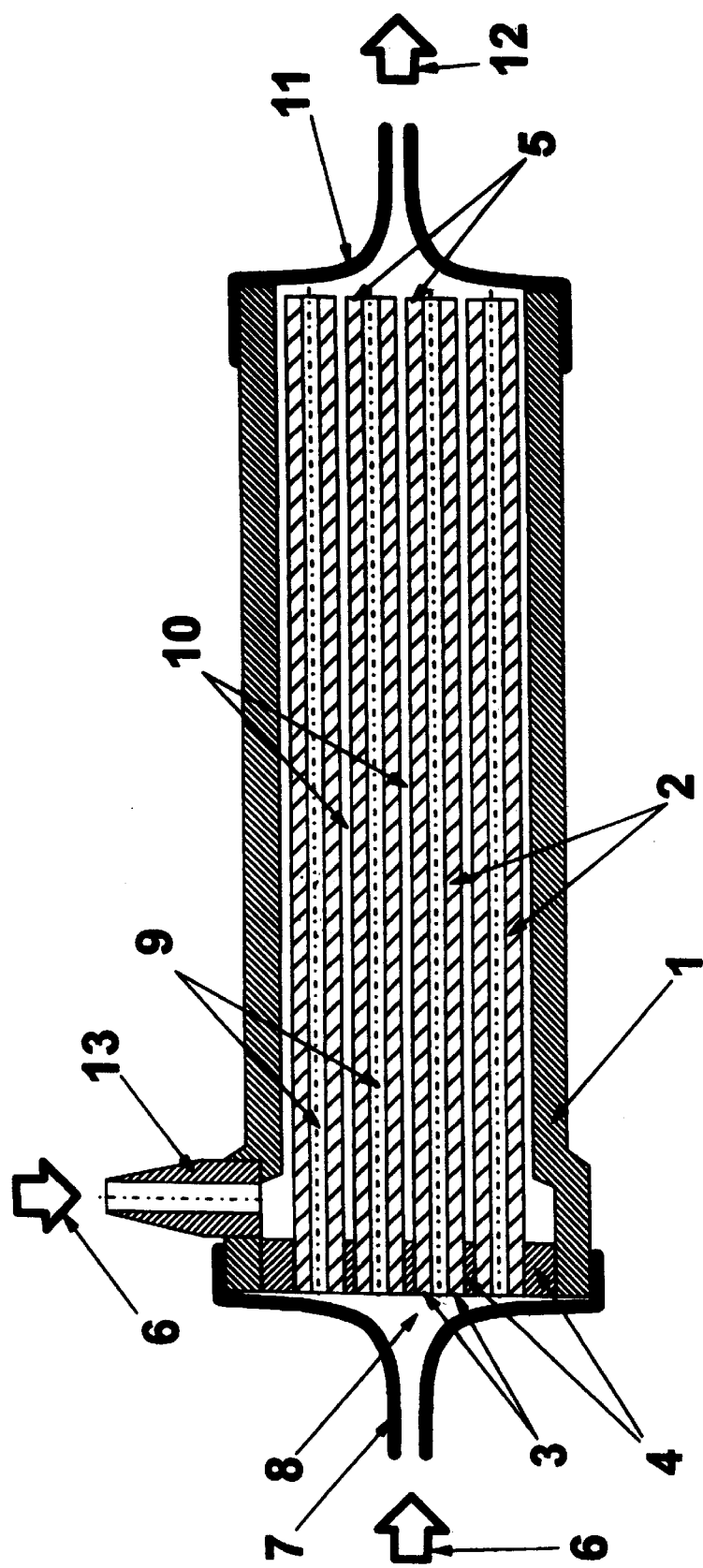
FIG. 5 shows a membrane module in which the primary stream flows on the outside and through the lumina of the hollow-fiber membranes.

FIG. 5 shows a membrane module according to the invention that has both an inlet arrangement 7 in communication with a distribution space 8, and via the latter with the lumina 9 of the hollow-fiber membranes 2, as well as an inlet arrangement 13 that leads into the external space 10 surrounding the hollow-fiber membranes 2 and is adjacent to the sealing compound 4. In such an embodiment of the membrane module according to the invention, different fluids can be fed alternately as a primary stream through the lumina of the hollow-fiber membranes and along the outside through the external space.

For example, a fluid to be treated, containing certain target substances, can first be introduced via the inlet arrangement 7 as a primary stream into the lumina 9 of the hollow-fiber membranes 2, whereby the inlet arrangement 13 remains closed. In the manner previously described, a permeate stream is produced through the semipermeable, porous walls of the hollow-fiber membranes 2, and the permeate stream is subjected to a substance-specific treatment, such as by adsorption of the target substances in the hollow-fiber membranes 2 and thus a charging of the hollow-fiber membranes 2 with the target substances. The permeate stream, minus the target substances, is drained from housing 1 via the outlet arrangement 11 together with the primary stream leaving the lumina 9 of the hollow-fiber membranes 2.

After exhausting the capacity of the hollow-fiber membranes with respect to the adsorbable amount of target substances, the target substance can, in a simple manner, be eluted from the hollow-fiber membranes by introducing an eluent into the external space 10 via the inlet arrangement 13, whereby the eluent flows through the external space as a primary stream. During this process, inlet arrangement 7 remains closed. In the manner also previously described, a permeate stream then passes through the semipermeable, porous walls of the hollow-fiber membranes 2, but this time in the direction opposite to that when charging the hollow-fiber membranes with the target substances, and elution of the target substances from the hollow-fiber membranes 2 can readily take place.

Figure 6:
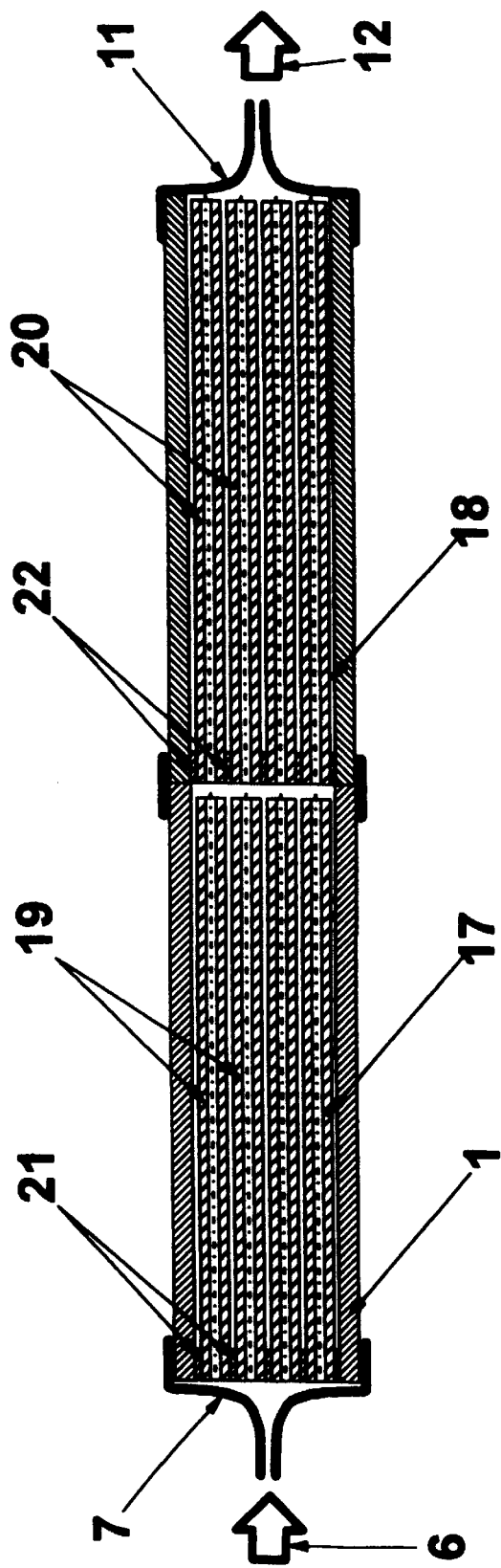
FIG. 6 shows a membrane module with two hollow-fiber membrane bundles arranged as stages in series and in which the primary stream flows through the lumina of the hollow-fiber membranes.

In FIG. 6, a membrane module according to the invention is illustrated that contains two hollow-fiber membrane bundles 17,18 arranged as stages in series, the hollow-fiber membranes 19,20 of which each are embedded with one of their ends in sealing compounds 21, 22. The fluid 6 to be treated is introduced into the housing 1 of the membrane module via the inlet arrangement 7 and flows first as a primary stream through the lumina of the hollow-fiber membranes 19 of the first membrane bundle 17. The resulting permeate stream is subjected to a first substance-specific treatment in the walls of the hollow-fiber membranes 19.

The permeate stream flowing through the external space in the vicinity of the first membrane bundle 17 unites in the vicinity of the unembedded ends of the hollow-fiber membranes 19 of the membrane bundle 17 with the primary stream leaving the lumina of the hollow-fiber membranes 19, and the resulting stream of the singly treated fluid subsequently flows in turn through the lumina as a primary stream into the hollow-fiber membranes 20 of the second membrane bundle 18.

At this point, the processes that took place in the vicinity of the first membrane bundle 17 are repeated, and a further substance-specific treatment of the permeate stream flowing through the walls of the hollow-fiber membranes 20 of the second bundle 18 takes place in the walls. The fluid stream 12, having been treated twice, is drained from the membrane module via the outlet arrangement 11. As previously noted, the immobilized, substance-specific groups in the hollow-fiber membranes of the individual stages can also be different, so that a fluid to be treated can be subjected to multiple different substance-specific treatments when flowing through a membrane module containing multiple stages.

Figure 7:
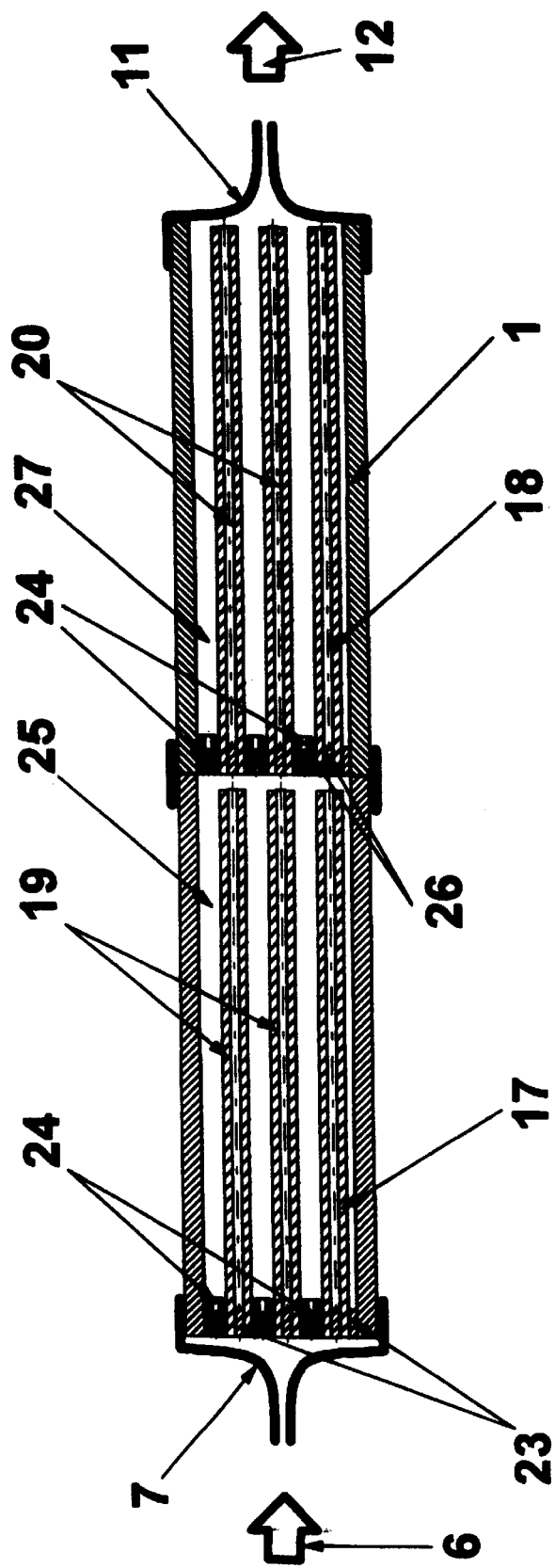
FIG. 7 shows a membrane module with two hollow-fiber membrane bundles arranged as stages in series and in which the primary stream flows on the outside of the hollow-fiber membranes.

One possibility of connecting multiple bundles of hollow-fiber membranes as stages in series, in the case in which the primary stream flows on the outside of the hollow-fiber membranes, is illustrated in FIG. 7. The fluid to be treated is—as in the examples in which the primary stream passes through the lumina—fed from the embedded ends of the hollow-fiber membranes via the inlet arrangement 7 into the distribution space 8 positioned upstream of the first stage. The distribution space 8 borders on one side with the sealing compound 23, via which the hollow-fiber membranes 19 of the bundle 17 of the first stage are embedded at their ends facing the inlet arrangement, such that their lumina are closed at these ends. Fluid-permeable elements 24 are also embedded in this sealing compound 23, which in the case illustrated are implemented as tubes or capillaries. Via these fluid-permeable elements 24, the fluid to be treated is introduced as a primary stream into the external space 25 surrounding the hollow-fiber membranes 19 of the first membrane bundle 17. As previously described, due to the prevailing pressure conditions a permeate stream flows through the semipermeable, porous walls of the hollow-fiber membranes 19 and is subjected there to a first substance-specific treatment. In the vicinity of the unembedded ends of the hollow-fiber membranes 19, the primary and permeate streams unite in the external space 25.

The fluid stream thus produced, already subjected to a first substance-specific treatment, is fed in the second stage to the bundle 18 of hollow-fiber membranes 20. This stage is implemented analogously to the first stage. Here as well, the sealing compound 26 has fluid-permeable elements 24 via which the fluid to be subjected to further substance-specific treatment is fed to the external space 27 surrounding the hollow-fiber membranes 20 of the second bundle 18. The processes taking place in this stage correspond to those in the first stage, whereby the permeate stream of the second stage is subjected to a further substance-specific treatment. The fluid stream 12, having been treated twice, is then drained from the membrane module via the outlet arrangement 11.

Figure 8:
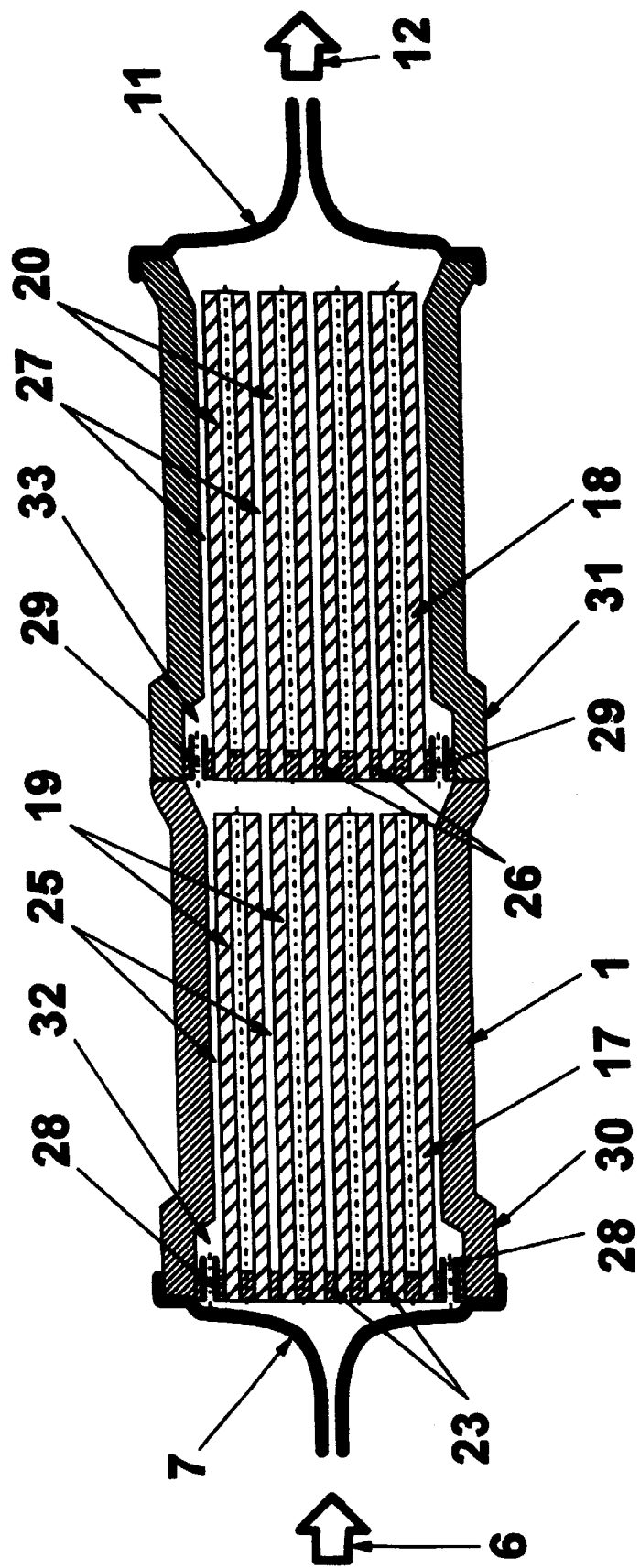
FIG. 8 shows a membrane module with two hollow-fiber membrane bundles arranged as stages in series and in which the primary stream flows on the outside of the hollow-fiber membranes and is introduced in ring channels.

A variation of the membrane module shown in FIG. 7, with two hollow-fiber membrane bundles 17,18 arranged as stages in series and in which the primary stream flows outside the hollow-fiber membranes 19,20, is shown in FIG. 8. In the membrane module according to FIG. 8, the introduction of the fluid 6 to be treated is also performed via the inlet arrangement 7. The primary stream is then fed from the end, i.e., from the plane formed in each case by the sealing compound 23,26 and the embedded ends of the hollow-fiber membranes 19,20 closed by the sealing compound 23,26, into the respective external space 25,27 surrounding the hollow-fiber membranes.

Fluid-permeable elements 28,29 are embedded in the sealing compounds 23,26 in a ring shape around the embedded ends of the hollow-fiber membranes 19,20 of the respective bundles 17,18, the elements in the illustrated example being implemented as short tubes or capillaries and passing through the sealing compounds 23,26. In the vicinity of the sealing compounds 23,26, the housing 1 has expansions 30,31 with respect to its inside diameter. On the one hand, this achieves a uniform feeding of the fluid to be treated to the fluid-permeable elements 28,29. On the other hand, via these expansions 30,31, ring channels 32,33 are implemented downstream from the sealing compounds 23,26, into which channels the fluid-permeable elements 28,29 lead, resulting in a uniform distribution of the primary stream over the respective bundle cross-section.

What is claimed is:

1. Membrane module for substance-specific treatment of a fluid, comprising:
   a) a housing extending in a longitudinal direction;
   b) therein, arranged substantially in the longitudinal direction, at least one bundle of hollow-fiber membranes with semi-permeable walls having a porous structure, wherein said hollow-fiber membranes each have first and second ends and at least one lumen extending along a longitudinal axis of the membrane, wherein each hollow-fiber membrane is embedded in the housing via a sealing compound only at the first end and flow around the second end is substantially unrestricted, and wherein the hollow-fiber membranes are surrounded by an external space delimited by the inner wall of the housing and by the sealing compound, each hollow-fiber membrane having an inside facing its at least one lumen and an outside facing the external space;
   c) at least one first inlet arrangement for introducing fluid to be treated into the housing on only one of two sides (inside or outside) of the hollow-fiber membranes at a time; and
   d) an outlet arrangement for draining the treated fluid from the housing, whereby the outlet arrangement is open toward the external space surrounding the hollow-fiber membranes;
   the lumens of the hollow-fiber membranes being open at their second ends and leading into the external space.

2. Membrane module according to claim 1, wherein the at least one first inlet arrangement leads into the external space and is adjacent to the sealing compound.

3. Membrane module according to claim 2, wherein the lumens of the hollow-fiber membranes are closed at their embedded first ends.

4. Membrane module according to claim 1, wherein the at least one first inlet arrangement is in communication with a distribution space that is adjacent to an end face of the sealing compound and spatially separated from the external space by the sealing compound.

5. Membrane module according to claim 4, wherein the distribution space is in communication with the lumens of the hollow-fiber membranes, the first ends of which extend through the sealing compound and are open at said first ends.

6. Membrane module according to claim 4, wherein the distribution space is in communication with the external space surrounding the hollow-fiber membranes via passages through the sealing compound and that the lumens of the hollow-fiber membranes are closed at their embedded first ends.

7. Membrane module according to claim 6, wherein the passages are defined by fluid-permeable elements.

8. Membrane module according to claim 7, wherein the fluid-permeable elements are capillaries or tubes.

9. Membrane module according to claim 4, wherein at least one second inlet arrangement leads into the external space and is adjacent to the sealing compound, and the distribution space is in communication with the lumens of the hollow-fiber membranes, the first ends of said hollow fiber membranes extending through the sealing compound and being open into the distribution space.

10. Membrane module according to claim 1, wherein the hollow-fiber membranes of the bundle are spaced from each other by spacers.

11. Membrane module according to claim 10, wherein the hollow-fiber membranes are bound via the spacers into at least one hollow-fiber mat.

12. Membrane module according to claim 1, wherein a plurality of the bundles of hollow-fiber membranes are arranged as stages in series in said longitudinal direction in the housing.

13. Membrane module according to claim 1, wherein the hollow-fiber membranes have a BET surface area between 2 and 300 $m^2$ per $cm^3$ of membrane volume.

14. Membrane module according to claim 13, wherein the BET surface area is between 8 and 30 $m^2$ per $cm^3$ of membrane volume.

15. Membrane module according to claim 1, wherein the hollow-fiber membranes are comprised of at least one member selected from the group consisting of cellulose, polyamide, polypropylene, polysulfone, polytetrafluoroethylene, polyvinylidene fluoride, and modifications, blends, mixtures, or copolymers derived therefrom.

16. Membrane module according to claim 1, wherein substance-specific groups are immobilized on and/or in the hollow-fiber membranes.

17. Membrane module according to claim 16, wherein the substance-specific groups are ligands for affinity separation of ligates from the fluid to be treated.

18. Membrane module according to claim 16, wherein the substance-specific groups are catalysts.

19. Process for substance-specific treatment of a fluid, comprising passing the fluid through a membrane module according to claim 1, said process comprising at least the steps of:
   a) introducing the fluid to be treated into the housing
   b) passing the fluid as a primary stream over one of the sides of the hollow-fiber membranes, such that a portion of this primary stream flows as a permeate stream into the wall of the hollow-fiber membranes via this one side, through the wall to the respective other side, whereby the substance-specific treatment of the fluid takes place on the portion of the fluid representing the permeate stream, and then out of the wall through the other side;
   c) combining the permeate stream, after flowing through the wall of the hollow-fiber membranes and after substance-specific treatment, with the primary stream flowing on the one side of the hollow-fiber membranes to form a combined stream; and
   d) draining the combined stream from the housing.

20. Process according to claim 19, wherein steps b) and c) are repeated multiple times.

21. Process according to claim 20, wherein the treatment of the fluid is conducted in multiple bundles of the hollow-fiber membranes, the bundles arranged spatially as stages in series in the longitudinal direction.

22. Process according to claim 21, wherein the number of stages is between 1 and 100.

23. Process according to claim 19, wherein the fluid is recirculated.

24. Process according to claim 19, wherein the fluid is a suspension.

25. Process according to claim 19, wherein said process comprises at least one of cleaning and separating ligates from a ligate-containing liquid by affinity, wherein ligands for said ligates are immobilized on and/or in the membranes.

26. Process according to claim 19, wherein said process comprises catalytic treatment of the fluid and at least one catalyst is immobilized on and/or in the membranes.

* * * * *

UNITED STATES PATENT AND TRADEMARK OFFICE
CERTIFICATE OF CORRECTION

PATENT NO. : 6,270,674 B1
DATED : August 7, 2001
INVENTOR(S) : Ulrich Baurmeister and Rudolf Wollbeck It is certified that error appears in the above-identified patent and that said Letters Patent is hereby corrected as shown below:

Title page, Item [54], and Column 1, lines 1-3,
change "MEMBRANE MODULE WITH UNILATERALLY EMBEDDED HOLLOW FIBER MEMBRANES" to -- MEMBRANE MODULE WITH HOLLOW-FIBER MEMBRANES EMBEDDED AT ONE END --.

Column 4,
Line 48, after "objects" insert -- are --; and
Line 54, change "stricture," to -- structure, --.

Column 6,
Line 59, change "fluid permeable" to -- fluid-permeable --.

Column 7,
Line 25, after "of" delete "the".

Column 10,
Line 47, after "fiber" insert -- mats in each --; and
Line 47, after "bundle" delete "in each mat".

Column 12,
Line 12, change "the." to -- the --;
Line 51, after "membrane" insert -- modules --;
Line 51, delete "the" (first occurrence); and
Line 55, change "substancespecific" to -- substance-specific --.

Column 13,
Line 18, change "is" to -- and --.

Column 14,
Line 24, change "polytetrafluoroethy-Lene," to -- polytetrafluoroethylene, --.

Column 18,
Line 10, after "second ends" insert -- 5 --.

UNITED STATES PATENT AND TRADEMARK OFFICE
CERTIFICATE OF CORRECTION

PATENT NO.     : 6,270,674 B1
DATED          : August 7, 2001
INVENTOR(S)    : Ulrich Baurmeister and Rudolf Wollbeck It is certified that error appears in the above-identified patent and that said Letters Patent is hereby corrected as shown below:

<u>Column 22,</u>
Line 30, after "housing" insert -- ; --.

Signed and Sealed this

Nineteenth Day of March, 2002

*Attest:*

*Attesting Officer*

JAMES E. ROGAN
*Director of the United States Patent and Trademark Office*